United States Patent [19]

McCoy et al.

[11] 4,321,147
[45] Mar. 23, 1982

[54] DEMULSIFICATION OF BITUMEN EMULSIONS WITH A HIGH MOLECULAR WEIGHT POLYOL CONTAINING DISCRETE BLOCKS OF ETHYLENE AND PROPYLENE OXIDE

[75] Inventors: David R. McCoy, Austin, Tex.; Colin L. LaBerge, Alberta, Canada

[73] Assignees: Texaco Inc., White Plains, N.Y.; Texaco Canada, Inc., Ontario, Canada

[21] Appl. No.: 152,452

[22] Filed: May 22, 1980

[51] Int. Cl.$^3$ .................. B01D 17/04; C10G 1/00
[52] U.S. Cl. .................. 210/708; 208/11 R; 208/188; 252/331; 252/340
[58] Field of Search ............... 208/11 R, 11 LE, 188; 210/708; 252/328, 329, 331, 340, 344, 358

[56] References Cited

U.S. PATENT DOCUMENTS

| | | | |
|---|---|---|---|
| 2,964,478 | 12/1960 | Monson | 252/331 |
| 3,330,757 | 7/1967 | Bichard | 252/331 X |
| 3,331,765 | 7/1967 | Canevari et al. | 252/331 X |
| 4,098,692 | 7/1978 | Baker et al. | 252/340 X |

FOREIGN PATENT DOCUMENTS 546155  9/1957  Canada ................. 252/340

*Primary Examiner*—Thomas G. Wyse
*Attorney, Agent, or Firm*—Carl G. Ries; Robert A. Kulason; Kenneth R. Priem

[57] ABSTRACT

A process for recovering bitumen from oil-in-water (O/W) emulsions is disclosed wherein water soluble demulsifiers are used. These demulsifiers are polyols of 4 and greater functionality containing discrete blocks of ethylene oxide and propylene oxide wherein the ethylene oxide content of the polyol is greater than about 50% but less than about 95%. The molecular weight of these polyols is greater than about 12,000. To resolve the bituminous petroleum emulsions, the process is carried out between 25° and 120° C. wherein the demulsifier of the invention is contacted with the bituminous emulsion.

5 Claims, No Drawings

DEMULSIFICATION OF BITUMEN EMULSIONS WITH A HIGH MOLECULAR WEIGHT POLYOL CONTAINING DISCRETE BLOCKS OF ETHYLENE AND PROPYLENE OXIDE

BACKGROUND OF THE INVENTION

1. Field of the Invention

This invention is concerned with the breaking or resolution of oil-in-water (O/W) bituminous emulsions by treatment with water soluble block polyols of relatively high molecular weight containing ethylene oxide and propylene oxide.

2. Description of the Prior Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi solid. These bituminous hydrocarbons are usually characterized by being very viscous or even non flowable under reservoir conditions by the application of driving fluid pressure.

Where surface mining is not feasible, the bitumen must be recovered by rendering the tar material mobile in situ and producing it through a well penetrating the tar sand deposit. These in situ methods of recovery include thermal, both steam and in situ combustion and solvent techniques. Where steam or hot water methods are used, a problem results which aggravates the recovery of the bitumen. The difficulty encountered are emulsions produced by the in situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in C. W. W. Gewers, *J. Canad. Petrol. Tech.*, 7(2), 85–90 (1968). (Prior art Reference A). There is much prior art concerning the resolution of normal W/O emulsions. Some of the art even mistakenly equates bitumen O/W emulsions with these W/O emulsions. The following is a list of several art references.

B. N. Schonfeldt, *Surface Active Ethylene Oxide Adducts*, Pergamon Press, New York, 1969, Section 4.11.2, pp. 577–582 describes the types of chemical demulsifiers used to treat standard crude oil emulsions of the W/O type. Included are the Pluronic surfactants having 20–30 wt. % ethylene oxide in the structure.

C. In U.S. Pat. No. 4,139,451, tar-water from a coking operation is demulsified with

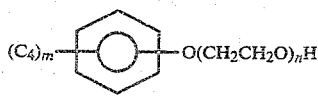

where m=2 or 3, n=12.

D. *Chem. Abstr.* 90 206927z discloses the use of

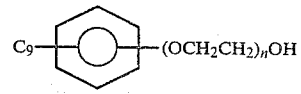

where n=2.9 or 3.1 in $H_2O$ to extract bitumen from Athabasca tar sands in the presence of kerosine, presumedly active because of its ability to stabilize the W/O emulsions formed.

E. Several Esso Patents by Canevari, et. al. (U.S. Pat. Nos. 3,296,117; 3,331,765; 3,893,907) disclose mechanical demulsification processes for tar sand emulsions involving mixtures of one or more of the following demulsifiers: acid esters of ethoxylated alkylphenol-formaldehyde condensates; amine alkoxylates from 40:60 to 60:40 mixtures of ethylene oxide and propylene oxide, and Pluronic type surfactants. In U.S. Pat. No. 3,893,907 the structure of applicable Pluronics is given. According to the structure given, molecular weight may vary from 1,000 to over 16,000 but ethylene oxide content (by weight) is impossible to gauge due to an apparent error in the chemical structure as given. No examples of the use of Pluronics could be found in any of these patents.

F. J. A. Richard (Esso), U.S. Pat. No. 3,330,757 is as E above, but surfactants (which may be sorbitan type, standard nonionics, or Pluronics) are recommended to be in the HLB range of 10–18.

G. Texaco Canada was granted a recent patent, U.S. Pat. No. 4,058,453, for breaking tar sand emulsions using high molecular weight poly(ethylene oxides) of greater than or equal to 100,000 molecular weight with optional addition of an alkaline earth metal halide.

H. U.S. Pat. No. 3,553,100 (Shell Oil) discloses a method for breaking tar sand emulsions utilizing a chemical demulsifier "in which ethylene oxide groups, acyl radicals and from about 10 to 22 carbon atoms are contained in each of the molecules of a surfactant that exhibits a significant amount of solubility in both oil and brine". The surfactant is presumedly of the type

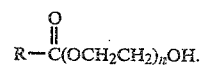

I. U.S. Pat. No. 3,334,038 (Petrolite) discloses an electrical-chemical process for breaking tar sand emulsions utilizing a chemical demulsifier, a polyester of a polyalkyleneether glycol and a polycarboxylic acid.

It is an object of the present invention to provide a method whereby O/W bitumen emulsions may be broken by treatment with a class of block polyols which would not be useful in the breaking of normal W/O emulsions.

SUMMARY OF THE INVENTION

The invention is a method for recovering petroleum from O/W bitumen emulsions by resolving or breaking these emulsions by contacting the emulsions at a temperature of between 25° and 120° C. with a water soluble block polyol of about 4 to 8 functionality containing both ethylene oxide and propylene oxide discrete blocks wherein the ethylene oxide content is greater than 50% and less than about 95% and the molecular weight of the polyol is greater than about 12,000. Specifically, the demulsifiers useful in the process of this invention are represented by the following general structure:

$$R[[(OR')_l(OR'')_m]_nOH]_x$$

where R is a carbon containing moiety of from about 4 to about 12 carbon atoms, x is from about 4 to about 8, l and m have average values equal to or greater than about 4 and preferably equal to or greater than about 8 and n is equal to about 1 to 5 and R' is propylene and/or butylene and R'' is ethylene (or alternatively R' is ethylene and R'' is propylene and/or butylene). The compounds are prepared by conventional alkoxylation of a polyol initiator of generally less than 500 molecular weight using alkylene oxide such as ethylene oxides, 1,2-propylene oxide, and/or 1,2-butylene oxide under known conditions of temperature and catalysis. The resulting demulsifier has a minimum average molecular weight of about 12,000 and a weight percent ethyleneoxy content of from about 50% to about 95%.

DESCRIPTION OF THE PREFERRED EMBODIMENTS

The process of this invention utilizing the chemical demulsifier as described above provides improvement over prior art techniques. The present process utilizes as a chemical demulsifier a polyoxyethylene-containing polyol without the necessity of further reacting such a polyol with polycarboxylic acid to achieve good results as in the process of prior art reference H or extending the molecular weight of the polyol to extremely high values as is required in prior art reference G which is also very expensive. As the following examples will show, contrary to prior art references C and F, standard hydrophilic nonionic surfactants of the alkylphenol ethoxylate or sorbitan class do not function well as demulsifiers for bitumen emulsions (see Examples VIa and VIe). Also, as the examples will show, contrary to reference B, Pluronic type surfactants of structure

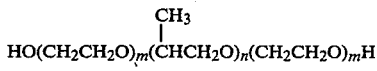
$$HO(CH_2CH_2O)_m(\overset{\underset{\displaystyle CH_3}{|}}{CH}CH_2O)_n(CH_2CH_2O)_mH$$

having 20 to 30% EO content do not function as demulsifiers for bitumen systems as they do with other crude oil systems (see Example VIk).

Also, as the following examples will show, prior art reference E is mistaken when it states that in general Pluronic type surfactants may be used as chemical demulsifiers independent of molecular weight and ethylene oxide content. The actual range of effective range demulsifiers of the Pluronic type was surprisingly found to be much more narrow as evidenced by the negative results obtained in Example VIb, VId, and VIk.

Also, in contrast to a statement in prior art reference F limiting useful Pluronic demulsifiers to those having HLB values of 10 to 18, the only active Pluronic demulsifier we found for bitumen emulsions had an HLB of 22 (see Example VIc). This Pluronic demulsifier is not within the scope of this invention but is presented here to point out the fruitlessness of relying on prior art references in this area due to the unique nature of the bitumen O/W emulsions.

Also, the prior art only mentions standard polyalkyleneoxy block co-polymers as potential demulsifiers when they have the Pluronic structure (i.e. the chemical structure shown in the Summary of the Invention where x is 2 and n is 1). It was surprisingly found that structures based on higher functionality initiators with x=4, for example (see Example VIg) and/or those with several alternating hydrophobic and hydrophilic blocks (n=3, Example VIi) function well as chemical demulsifiers for bitumen emulsions.

The polyol demulsifiers of this invention are made by alkoxylation of an initiator of the desired functionality having active hydrogens for the alkoxylation reaction. Many initiators are known to those skilled in the art. Illustrative of acceptable initiators are trimethylolpropane and glycerine, for example, if a functionality of three (3) is desired and sucrose, sorbitol, pentaerythritol and mannitol, for example, if a higher functionality is desired. Many common glycols, such as propylene glycol, may be used if a diol is desired.

In this invention, these initiators may be used as such or already alkoxylated to a low molecular weight usually not exceeding 500.

The produced bitumen emulsions may be treated by the process of our invention in a conventional manner, for example, in a conventional horizontal treater operated, for example, from about 25° to 120° C. and, preferably, from about 50° to 90° C. at atmospheric or slightly higher pressures. The concentration of the chemical demulsifier described above used in treating the bitumen in water emulsions may range from about 1 to 200 parts per million and, preferably, from about 10 to 100 parts per million with the optional addition of an organic diluent and/or inorganic salt as well as standard flocculants and mechanical or electrical means of demulsification.

The following examples describe more fully the present process. However, these examples are given for illustration and are not intended to limit the invention.

EXAMPLE I

Preparation of Low Molecular Weight Pentaerythritol Polyol with Propyleneoxy and Ethyleneoxy Blocks A 5-gallon pressure reactor equipped with mechanical stirrer was charged with 3 lb. of pentaerythritol 24-molar propoxylate and 14 g KOH. Water was removed by vacuum treatment at 100°–110° C. followed by addition of 4 lb. propylene oxide at 115°–120° C. This product had an hydroxyl number of 88.2. Three pounds of this material was charged to a 5-gallon pressure reactor and treated with 7 pounds ethylene oxide at 115° C. The final product had a molecular weight of 8400, basis the hydroxyl number and contained 70% ethylene oxide, by weight.

EXAMPLE II

Preparation of High Molecular Weight Pentaerythritol Polyol with Propyleneoxy and Ethyleneoxy Block Four pounds of the product of Example I was charged to a 5-gallon pressure reactor, contents purged with $N_2$, and treated with 8 pounds ethylene oxide at 120° C. The product had a molecular weight, basis the hydroxyl number of 18,900 and contained 90% by weight ethylene oxide.

EXAMPLE III

Preparation of Low Molecular Weight Sucrose Polyol with Propyleneoxy and Ethyleneoxy Block A 5-gallon pressure reactor equipped with mechanical stirrer was charged with 3 pounds sucrose 8-molar propoxylate and 8 g potassium hydroxide. The mixture was vacuum stripped for one hour at 120° C., nitrogen purged and treated with 3 pounds propylene oxide at 110°-125° C. followed by treatment with 12 pounds ethylene oxide at 125° C. The product had a molecular weight of 4,900, basis the hydroxyl number and contained 66.7% ethylene oxide.

EXAMPLE IV

Preparation of Sucrose Polyol with Alternating Blocks of Propyleneoxy and Ethyleneoxy Units To 5 pounds of the product of Example III in a 5-gallon pressure reactor were added successively at 125° C., 4 g KOH ($H_2O$ subsequently removed in vacuum), 3 pounds propylene oxide, and 12 pounds ethylene oxide. To 5 pounds of this product were added 1.5 pounds propylene oxide and then 6 pounds ethylene oxide at 135° C. The final product had a molecular weight, basis the hydroxyl number of 30,000 and contained 79 weight percent ethylene oxide.

EXAMPLE V

Preparation of Hydrophobic Sorbitol Polyol with Propyleneoxy and Ethyleneoxy Blocks Using the alkoxylation methods described in Examples I-IV, sorbitol 174-molar propoxylate was treated with 85 moles ethylene oxide to prepare a product of about 14,000 molecular weight hydroxyl number=24.5 having 26.6 weight percent ethylene oxide content.

EXAMPLE VI

Demulsifier Testing of Various Chemicals

The following basic testing procedure was employed:
(a) A 1% solution of each chemical was prepared (in $H_2O$ or in toluene).
(b) 100 ml of fresh, hot bitumen emulsion of known bitumen content obtained by in situ steam flooding in tar sand pattern located at Ft. McMurray, Alberta, Canada was poured into a sample bottle.
(c) 50 parts (volume) of Wizard Lake crude was added as diluent to 100 parts bitumen contained in the emulsion.
(d) Chemical was added to the diluted emulsion at the following concentrations: 10, 20, 30, 50, 75 and 100 ppm.
(e) Contents of the bottles were mixed and placed in an oven at 180°-200° F. for a 24 hour period.
(f) BS & W determinations were made on the oil layer and for some systems the oil content in the water layer was estimated by the following method:
(i) A series of color standards were prepared by dissolving 750, 500, 250, 200, 150, 100, 75, 50 and 25 ppm by weight of bitumen directly in 1,1,1-trichloroethane.
(ii) 5 ml of the water layer in a sample bottle was transferred to a separatory funnel.
(iii) The water aliquot was extracted with 25 ml of 1,1,1-trichloroethane and the extract filtered to remove solids.
(iv) The extracted solvent was compared as to color with the prepared standards in identically sized vials (Dilution of the extract with more solvent was used if necessary). From this comparison the original oil content of the water was estimated. With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion, and a small (sometimes non-existent) dark water layer containing particles or chunks of solid bitumen and clay.

Specific test results are summarized in the following table. Examples VIg and VIi are illustrative of demulsifiers falling within the scope of the invention.

TABLE
EXAMPLE VI
Demulsifier Testing

| Emulsion Example VI | Candidate Demulsifier* | % Bitumen in Emulsion | % BS & W in Oil (ppm chemical used) | Treated Middle Phase | Water Phase |
|---|---|---|---|---|---|
| a | Surfonic ® N-400 | 12-16 | 15(100) | large | — |
| b | Pluronic ® L-77 | 12-16 | layer mainly diluent | contains clay and oil | — |
| c | Pluronic F-127 | 12-16 | 5(20,50) | small, stable interface | very little oil present |
| d | Pluronic F-88 | 22 | 35(100) | wide | muddy |
| e | Tween ® 20 | 24 | layer mainly diluent | very large | dark, muddy |
| f | Product of Ex. I | 32 | 21(30), 19(50) | wide | muddy |
| g | Product of Ex. II | 24 | 5(20,50) | small | muddy, contains bitumen |
| h | Product of Ex. III | 38 | layer mainly diluent | large | light, muddy |
| i | Product of Ex. IV | 22 | 6-7(30-100) | small | muddy, about 1% oil present |
| j | Product of Ex. V | 22 | layer mainly diluent | very wide | dark, muddy |
| k | Surfonic PE-2525 | 24 | layer mainly diluent | wide | dark, muddy contains solid bitumen |

*Sulfonic N-400 = nonylphenol 40-molar ethoxylate; Pluronic L-77 = 2050 mw PPG ethoxylated to final % EO of 70%; Pluronic F-127 = 4000 mw PPG ethoxylated to final % EO of 70%; Pluronic F-88 = 2250 mw PPG ethoxylated to final % EO of 80%; Tween 20 = sorbitan monolaurate 20-molar ethoxylate; Surfonic PE-2525 = 1875 mw PPG ethoxylated to final % EO of 25%.

We claim:
1. A process for recovering petroleum from oil-in-water bitumen emulsions by demulsifying said emulsions by adding thereto demulsifiers of the following general structure:

$$R[[(OR')_l(OR'')_n]_nOH]_x$$

where R is a carbon-containing moiety of from about 4 to about 12 carbon atoms, x is from about 4 to about 8, l and m have average values equal to or greater than about 4 and n is equal to about 1 to 5 and R' is propylene and/or butylene and R" is ethylene or alternatively R" is ethylene and R" is propylene and/or butylene and wherein the average molecular weight of the demulsifier is above about 12,000 and the weight percent ethyleneoxy in the demulsifier is from about 50 to about 95% said demulsifier being added in amounts effective to demulsify the emulsion.

2. A process as in claim 1 wherein the demulsifiers are prepared by alkoxylation of a polyol initiator of less than about 500 molecular weight.

3. A process as in claim 1 wherein the demulsifier is present with the emulsions at concentrations ranging from about 1 to about 200 parts per million.

4. The process of claim 1 wherein an organic diluent is present.

5. The process of claim 1 wherein the demulsification takes place at a temperature of from about 25° to about 120° C.

* * * * *